United States Patent [19]
Pearlstein et al.

[11] Patent Number: 5,568,200
[45] Date of Patent: Oct. 22, 1996

[54] METHOD AND APPARATUS FOR IMPROVED VIDEO DISPLAY OF PROGRESSIVELY REFRESHED CODED VIDEO

[75] Inventors: Larry A. Pearlstein, Newtown, Pa.; Joseph E. Augenbraun, Princeton; Frank A. Lane, Medford Lakes, both of N.J.

[73] Assignee: Hitachi America, Ltd., Tarrytown, N.Y.

[21] Appl. No.: 477,787

[22] Filed: Jun. 7, 1995

[51] Int. Cl.$^6$ .................................................... H04N 7/64
[52] U.S. Cl. .................................... 348/426; 348/466
[58] Field of Search ........................ 348/426, 466, 348/432, 400, 415, 409; H04N 7/13, 7/64

[56] References Cited

U.S. PATENT DOCUMENTS

| | | | |
|---|---|---|---|
| 5,144,425 | 9/1992 | Joseph ........................ | 358/133 |
| 5,148,272 | 9/1992 | Acampora et al. ............ | 358/133 |
| 5,212,549 | 5/1993 | Ng et al. ...................... | 358/135 |
| 5,231,384 | 7/1993 | Kuriacose .................... | 358/141 |
| 5,241,382 | 8/1993 | Paik et al. .................... | 358/133 |
| 5,243,428 | 9/1993 | Challapali et al. ............ | 358/167 |
| 5,262,854 | 11/1993 | Ng .............................. | 358/133 |
| 5,325,125 | 6/1994 | Naimpally et al. ............ | 348/402 |
| 5,365,272 | 11/1994 | Siracusa ...................... | 348/426 |
| 5,371,547 | 12/1994 | Siracusa et al. .............. | 348/426 |
| 5,376,969 | 12/1994 | Zdepski ....................... | 348/466 |
| 5,398,072 | 3/1995 | Auld ............................ | 348/426 |
| 5,455,629 | 10/1995 | Sun et al. ..................... | 348/426 |

OTHER PUBLICATIONS

*Advanced Digital Television: System Description*, Jan. 20, 1992; ADTV Consortium.
*Advanced Digital Television: ADTV Prototype Hardware Description*, Feb. 12, 1992, ADTV Consortium.
*Digital Spectrum Compatible: Technical Details*, Sep. 23, 1991.
*Digicipher™ HDTV System Description*, General Instrument Corporation Videocipher Division, on behalf of The American Television Alliance, Aug. 22, 1991.

*Primary Examiner*—Victor R. Kostak
*Attorney, Agent, or Firm*—John J. Sideris

[57] ABSTRACT

A method and apparatus for controlling the display of progressively refreshed decoded compressed image representative data is disclosed. Subframes of intracoded video signals, and subframes of intercoded video signals based on the intracoded video signals of successive video frames are used to construct a reference video frame. Refresh descriptor data is provided indicating the number of video frames necessary for acquiring intracoded video signals to form the reference video frame. The display of video frames is inhibited based on the refresh descriptor data until a suitable video frame of intracoded video signals and intercoded video signals based thereon is constructed. In another embodiment of the invention, at least one array of memory elements is provided for storing data corresponding to the subframes of a video frame. Each subframe of a video frame corresponds to one element of the memory array. Data indications are stored to mark as "clean" or initialized the regions of subframes having intracoded video signals and subframes having intercoded video signals based on the intracoded video signals. Substitute video signals are provided to conceal portions of respective video frames not marked as initialized, thereby provide a more pleasing picture to the viewer.

17 Claims, 4 Drawing Sheets

5,568,200

METHOD AND APPARATUS FOR IMPROVED VIDEO DISPLAY OF PROGRESSIVELY REFRESHED CODED VIDEO

FIELD OF THE INVENTION

The present invention relates generally to a video encoder/decoder transmission system for providing video bitstreams that are compiled to form a video picture. In particular, the present invention provides a video encoder/decoder system having (i) an encoder that provides a video bitstream transmission with indicia of the number of frames needed for a complete reference picture, and (ii) a decoder that can record the regions of accurately decoded picture data in each frame.

BACKGROUND OF THE INVENTION

Television signals are conventionally transmitted in an analog form in accordance with the National Television Systems Committee ("NTSC") standard adopted in the United States. Television signals transmitted in a digital form deliver video and audio services of a much higher quality than analog transmissions. In an uncompressed form, digital television signals require the transmission of a much greater amount of data than analog systems. This is particularly true of high definition television ("HDTV") transmissions. Unfortunately, digital broadcast transmissions, including HDTV transmissions, are required to be broadcast in the same 6 MHz bandwidth provided under the NTSC standard for analog transmission.

As shown in FIG. 1, the video portion of current broadcast television signals contain a sequence of video "frames" that together provide a moving picture. A video frame is defined by pixels (picture elements) containing luminance (brightness) components and chrominance (color) components. The pixels are arranged horizontally and vertically in lines and columns to produce picture displays, such as, for example, 720 pixels×480 lines.

In a digital television transmission, a digital value is used to represent the intensity of each of the primary pixel colors red, green and blue. Accordingly, a digital representation of a single 720 pixel×480 line video frame display requires at least 8.3 megabits of data. High definition digital television, incorporating higher density pixel resolutions, requires even more data per frame.

Because 30 video frames are displayed each second in a television signal, the video picture data in a digital transmission must be compressed to be both manageable and to be broadcast within the 6 MHz broadcast. To that end, digital video data may be transmitted under, for example, data compression standards known as MPEG-1 (Motion Picture Experts Group) or MPEG-2. MPEG-2, of significance to the present invention, is the data compression standard described in the document "International Standards Organization—Moving Picture Experts Group, Recommendation ISO/IEC 13818-2: 1995(E)" (hereinafter "the 1995 ISO-MPEG International Standard"). Unless indicated otherwise, any reference made herein to MPEG-2 data bit streams refers to data bit streams that comply with MPEG-2 standards as defined in the November, 1995 ISO-MPEG International Standard.

MPEG-2 video compression techniques enable the transmission of digital television signals within the 6 MHz range used by conventional television transmissions. MPEG-2 video compression uses compression algorithms to take advantage of temporal and spatial redundancies among pixels in order to efficiently represent the important information in a video signal. The MPEG-2 standard stipulates that for every four luminance components, only two chrominance components need be represented because the human eye is much more sensitive to luminance components than to color components.

In digital television transmission, video data signals may be sampled, encoded and compressed in accordance with the MPEG-2 standard to produce a digital video data bitstream which may be modulated for transmission. An exemplary type of modulation is quadrature amplitude modulation (QAM), such as 64-QAM (64 quantizing levels). Another type of modulation is vestigial side band (VSB).

The video input data may be an interlaced format or a progressive format. Each frame in interlaced video consists of two fields of the picture which are separated by one field period. Each frame in progressive video consists of the entire picture.

Under the MPEG-2 standard, once video pixel data of a frame is sampled and digitized, it is encoded using techniques known as intraframe and interframe encoding. In general, intraframe encoding involves encoding a video frame from a single source frame to provide sufficient encoded spatial data for reconstruction of the video image from only the intraframe encoded data. An intraframe (designated I) encoded frame uses spatial compression without reference to any other frame. Conversely, interframe encoding involves the generation of encoded frame data from temporal differences between information in a current source frame and information in a frame predicted from prior or subsequent transmitted frames. There are two types of interframe encoded frames: predictive coded frames (designated P) and bidirectionally predictive coded frames (designated B). The P frames are predicted from a previous "anchor" frame (either I or P frames) and the B frames are predicted by interpolating from two bracketing anchor frames (either I or P) frames.

Under the MPEG-2 standard, a video frame may be divided into various subcomponents so that the picture represented by the frame can be processed as a plurality of smaller portions. These subcomponents are classified as blocks, macroblocks, and slices. A macroblock is made of a 16 pixel by 16 line section of luminance components and two spatially corresponding 8 pixel by 8 line sections (known as "blocks"), one for each chrominance component. In a macroblock, every luminance component of every pixel in the horizontal direction and every pixel in the vertical direction is represented. Only every other chrominance component (both vertically and horizontally) is similarly represented. As mentioned previously, MPEG-2 requires only one chrominance pair for every four luminance components for the same total area.

For each macroblock, the encoder chooses one of the intraframe or interframe coding modes. The coding mode chosen depends on the picture type, the effectiveness of motion compensation in the particular region of the picture, and the nature of the signal within the block. For intraframe encoding, only spatial redundancies occurring in the same frame are exploited. For interframe encoding, encoder estimates the motion vectors for each 16×16 macroblock in the video frame. Motion vectors give the displacement of each macroblock of pixels from frame to frame, exploiting the temporal redundancy found in the frames. For example, P frames are predicted from a single prior frame. B frames are predicted from one or both of a prior frame and a subsequent frame. A typical coding scheme contains a mixture of I-, P-, and B-pictures. An illustrative encoder might generate an I-picture every half a second, to give reasonably fast random access, with two B-pictures inserted between each pair of I- or P-pictures.

After the encoder performs the motion-compensated prediction of the macroblock contents for P and B frames, the encoder then produces an error signal by subtracting the prediction from the actual data in the current macroblock. The error signal is separated into 8×8 blocks (four luminance blocks and two chrominance blocks), and a DCT (discrete cosine transform) is performed on each 8×8 block.

The DCT operation converts the 8×8 block of pixel values into spatial frequency coefficients. The resulting DCT coefficients are then quantized to achieve compression thereof. Statistical encoding of the spatial coefficients takes advantage of the non-uniform distribution of DCT coefficients. Run length coding takes advantage of the long strings of coefficients with a magnitude of zero to achieve coding gain. In addition, variable length encoding of the coefficients assigns shorter codewords to frequent events and longer codewords to less frequent events, thereby achieving further video compression.

To accomplish transmission, the video information of a video frame is transmitted as a sequence of macroblock units. The macroblocks are transmitted in a video bitstream, with the beginning of one macroblock following the end of the previous one. The data representing a horizontal series of encoded macroblocks may be grouped together with a data header into what is referred to as "slices". The data representative of several video frames may also be grouped together with a data header. This is typically referred to as a "Group of Pictures" (also referred to as "GOP").

In general, the video bitstream can be thought of as a hierarchy of data structures containing one or more subordinate structures. For instance, an MPEG-2 structure referred to as "picture_data" contains one or more slices which contains one or more macroblocks. The highest data structure of the coded video bitstream is the video sequence. A video sequence begins with a sequence header which may be followed by a group of pictures header and then by one or more coded frames.

During the transmission of digital video signals, data other than the encoded video data must be transmitted within the video bitstream. Control or processing data, error correcting data, coded picture data, synchronization sequences and other information necessary to receive and process the digital video information must be communicated. The additional data is essential for reconstruction of the video sequence, and to permit the video data to survive the transmission errors that may occur, especially if the data is transmitted by terrestrial broadcasting. Compressed data are, in general, highly vulnerable to bit errors that result from noise in the transmission channel.

After the transmitted bitstream reaches a receiver, the control data is separated from the video data, which is decoded for display. The decoding process is essentially the reverse of the encoding process described above, that is, the variable length encoded data is decoded to yield the quantized data. This data is then dequantized to yield two-dimensional DCT coefficients. An inverse DCT ("IDCT") transform operation is performed on the data, and the data is rearranged and synthesized to obtain the picture data. When assembled, a complete picture frame is obtained. The output of the decoding process is a series of fields or frames that are normally the input of a display device for displaying the decoded bit stream.

For display, MPEG-2 allows a picture acquisition mode known as progressive refresh. Progressive refresh refers to any strategy other than providing complete I-frames. During progressive refresh, one or more macroblocks in each frame is represented with intraframe coding. Successive frames include different macroblocks represented with intracoding and macroblocks based on predictions from the earlier intracoded macroblocks. The intracoded macroblocks in each frame are chosen such that a complete reference picture can be constructed by a decoder after some number of frames.

Current video decoders, when initially presented with a coded video bitstream which uses progressive refresh, behave in one of the following two ways:

In a first technique, decoding starts from the first received frame, with the video picture being reconstructed as it arrives. Initially only a stored picture or synthetic pattern can be displayed. After a sufficient number of frames have been received so that the decoder is likely to have a complete reference picture, it displays the video pictures. However, one problem with this technique is that, in a typical MPEG-2 system, the decoder does not know a priori how many frames it will take to recover a complete reference picture. Another problem is that there is an added time delay from the selection of a new program, or the recovery of a data loss dropout, to when the viewer begins to see the program video.

A second technique allows the viewer to see video pictures as soon as possible. However, the problem with this second technique is that the viewer will see random picture data in areas that have been coded predictively but for which an accurate reference prediction has not yet been received.

Thus, there is a need for an encoder/decoder transmission system that can accurately signal the decoder as to the number of frames which need to be decoded before a complete reference picture is obtained. In addition, there is a need for a video encoder/decoder transmission system that can determine the regions of a picture frame which have been decoded for use as prediction references, so that concealment techniques can be accurately employed in the uninitialized data regions of the picture frame to provide for a more pleasing picture.

Accordingly, it is an object of present invention to provide a video encoder/decoder transmission system that can signal a video decoder as to the number of picture frames which need to be decoded during a progressive refresh operation before a complete reference picture can be decoded.

It is a further object of the present invention to provide a video encoder/decoder transmission system that can inhibit the display of picture frames until a reference picture is established, to avoid the display of frames containing unsuitable amounts of uninitialized video data.

It is another object of the present invention to provide a video encoder/decoder transmission system that can accurately record the regions of a picture which have been decoded into useful prediction references, so that the remaining data regions can be masked through concealment techniques.

It is yet another object of the present invention to provide a video encoder/decoder transmission system that provides for a faster presentation of more visually pleasing video pictures at the initial display of a new program or after a data loss dropout.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, a method and apparatus for controlling the display of progressively refreshed decoded compressed image representative data is disclosed. The image representative data is representative of a video frame divided into a plurality of subframes. The video frames include a plurality of subframes having intracoded video signals. Successive video frames include a plurality of subframes having intracoded video signals and subframes having intercoded video signals based on predictions from intracoded video signals. Subframes of intracoded video signals, and subframes of intercoded video signals based on the intracoded video signals of successive video frames are used to construct a reference video frame. The method and apparatus provides data indicating the number of video frames necessary for acquiring image representative data of subframes having intracoded video signals to form the reference video frame, and then inhibits the display of video frames until a suitable video frame of image representative data having intracoded video signals and intercoded video signals based thereon is constructed.

In another embodiment of the invention, the above described method and apparatus for processing and decoding compressed image representative data detects the video signals which are decoded from image representative data that is not initialized, and identifies these uninitialized video signals. At least one array of memory elements is provided for storing and mapping data indications for respective subframes of the video signals that are initialized. Substitute video signals for portions of respective frames not initialized, as indicated by the data stored in the memory elements, is provided to conceal uninitialized video signals and any errors in the video frame data, and thereby provide a more pleasing picture to the viewer.

DETAILED DESCRIPTION OF THE PREFERRED EMBODIMENTS OF THE INVENTION

The present invention contemplates an improved video encoder/decoder transmission system communicating digital video data having indicia of the frame data needed for the acquisition of a complete reference picture, and a receiver for receiving such data. In a preferred embodiment, the video data is compressed before communication in accordance with an MPEG-like/format.

For the purposes of this disclosure, "MPEG-like" refers to the coding format similar to the standardized MPEG-1 or MPEG-2 coding formats being established by the International Organization for Standardization. The standards are described in the documents "International Standards Organization"—Moving Picture Experts Group, coding of Moving Pictures and Associated Audio for Digital Storage Media up to about 1.5 Mbits, ISO 2 1172 rev 1, Jun. 10, 1992; and "International Organization for Standardization", ISO/IEC 13818-2:1995(E), respectively, which documents are incorporated herein by reference for description of the general code format. The terms used in this application are intended to be used in a manner that is consistent with the same terms used in the MPEG standards unless otherwise indicated. However, although the invention is described in terms of the MPEG-like formats, it should be understood that the present invention is applicable to any encoding format that provides cyclical prediction refresh of compressed video signals.

Figure 1:
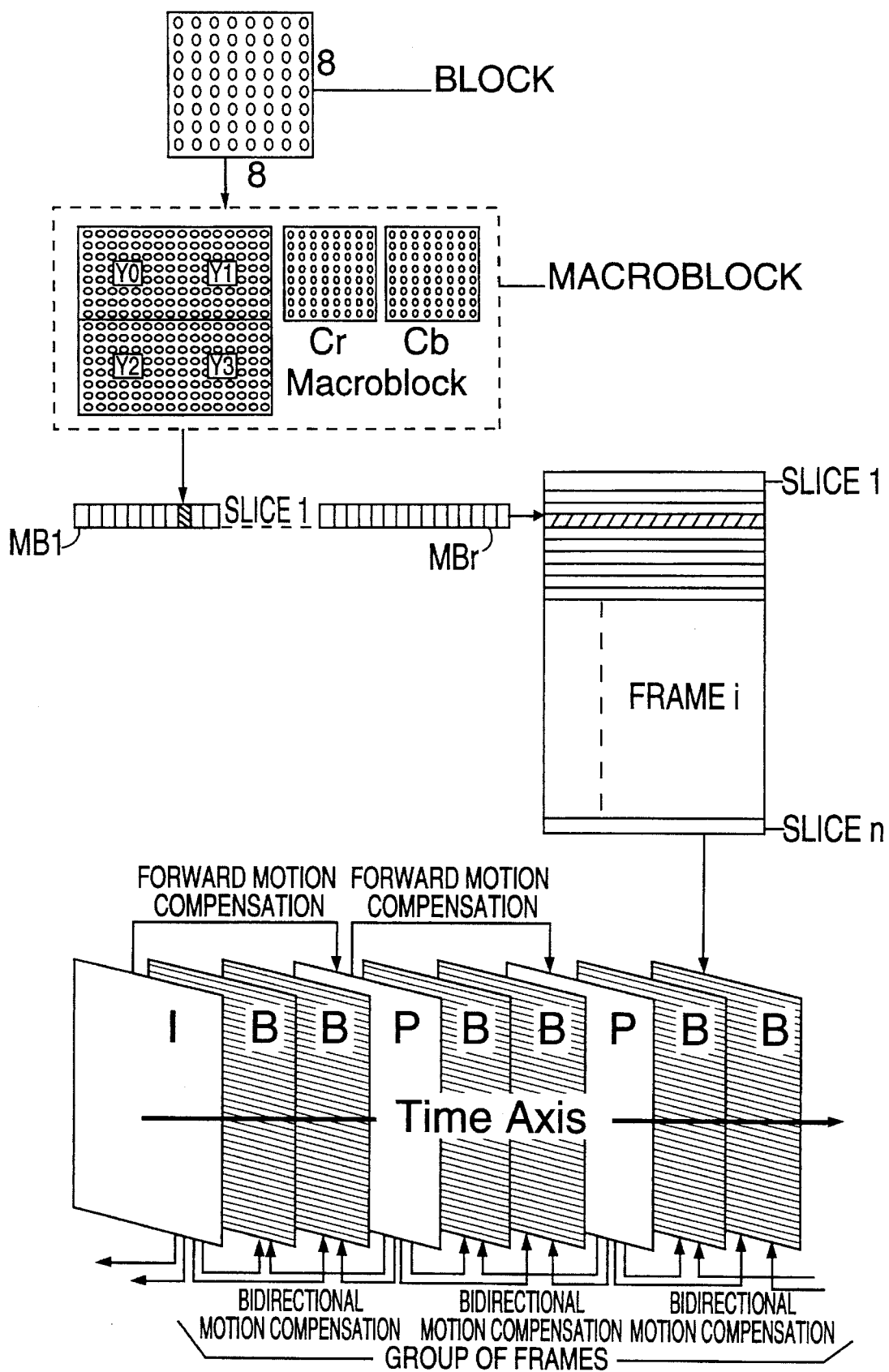
FIG. 1 is a diagram of a prior art arrangement of a digital video frame as subdivided into subframes, macroblocks and blocks containing bits of pixel data.
Figure 2:
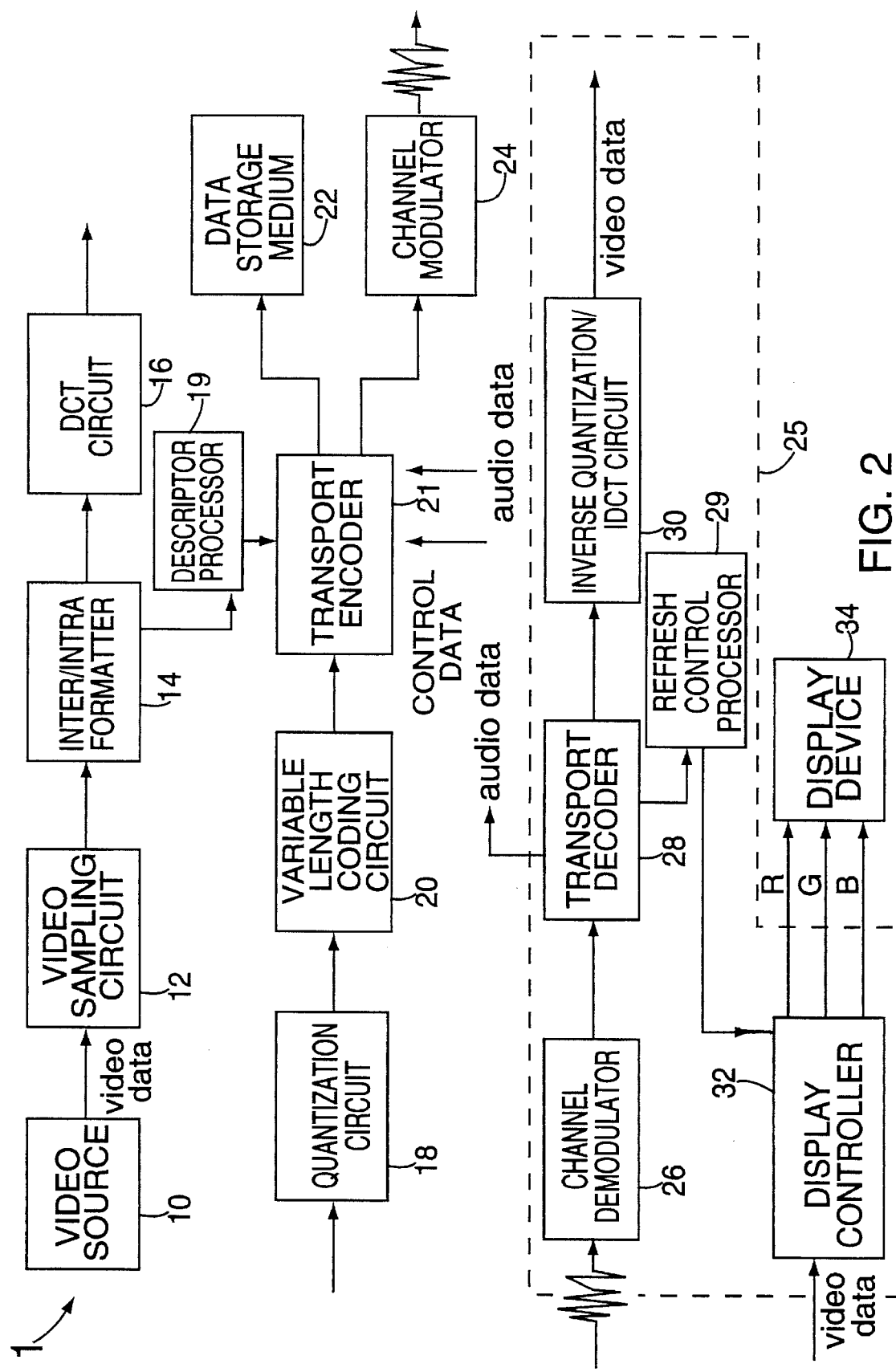
FIG. 2 is a block form diagram of the operative arrangement of the circuit components of the present invention.

Referring now to the drawings, wherein like numerals refer to like components, there is disclosed in FIG. 2, in block form, broad aspects of the preferred embodiment of the invention. In FIG. 2, a video encoder/decoder transmission system 1 is shown having a video source coder 10, such as, e.g., a video camera and preprocessing circuitry, providing video signals to a video sampling circuit 12. The video sampling circuit 12 samples the luminance components and chrominance components at, for example, a 4:2 ratio of a 16-pixel by 16-line section of a video frame. It should be noted that the video source coder 10 and video sampling circuit 12 do not form part of the invention and are provided only for case in understanding how the invention may be practiced.

The sampled video signal data is transmitted to an inter/intra formatting circuit 14. The inter/intra formatting circuit 14 selects which group of macroblocks will be intra-coded and which will be inter-coded in the next video frame. For example, the first row of macroblocks may be intra-coded in the first frame, and the second row of macroblocks may be intra-coded in the second frame. In this manner, a complete reference frame can be created after a certain number of frames are encoded. Typically, every macroblock position is intra-coded at least once over some period of time.

Although a repeating pattern of encoded regions is described in a preferred embodiment, it should be noted that the present invention is not limited to the encoding of any regularly repeating pattern of frame regions in order to create a complete reference picture. The present invention can provide for either the selection of a regular repeating pattern, or the selection of random frame regions. Moreover, the frame regions may be defined by macroblocks, slices or any other suitable sized region of the video frame. Note that the present invention is applicable in the case where I-frame refresh is used in conjunction with progressive refresh, and in the case where only I-frame refresh is used.

After the video data is formatted, it is communicated to a DCT (discrete cosine transform) circuit 16. The DCT circuit 16 converts the video data into spatial frequency coefficients. The spatial frequency data is then processed by the quantization circuit 18, where quantization intervals are identified by an index for subsequent decoding. The quantization intervals are chosen such that the human visual system is unlikely to perceive the inaccuracy of the particular spatial frequency after subsequent reconstruction of the picture data. Next, the quantized data is communicated to the variable length encoding circuit 20 where variable length encoding, as known to those skilled in the art, is performed to achieve further video compression.

In the preferred embodiment, after encoding, the data is ordered by a transport encoder 21 into a MPEG-like layered bitstream. According to the present invention, descriptive information is embedded into the bitstream by a descriptor processor 19, indicative of the number of frames which need to be decoded before a complete reference picture can be established. In addition, other related information such as, for example, refresh region information is embedded into the bitstream by the descriptor processor 19.

Figure 3:
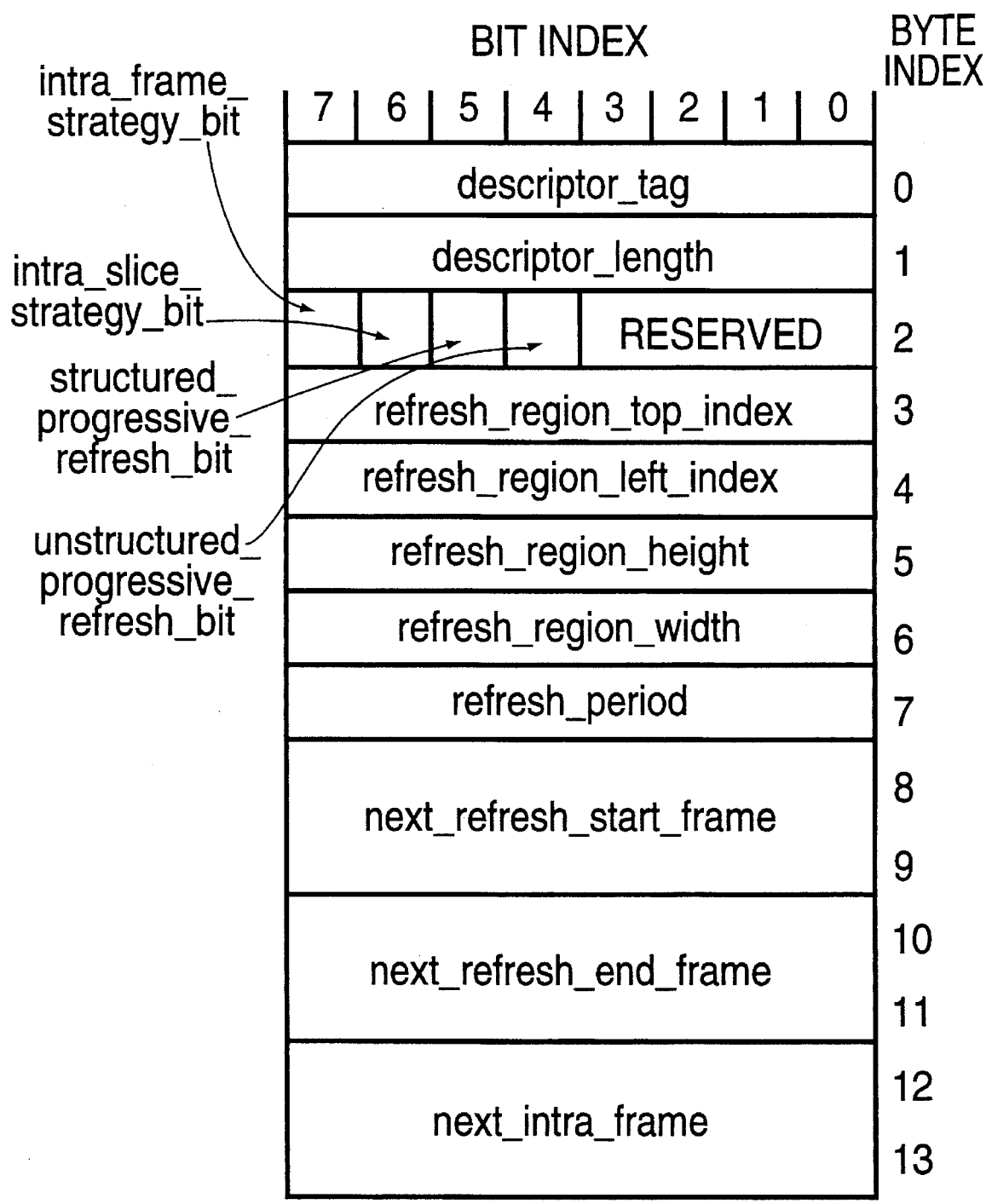
FIG. 3 is a diagram of a data multiplex format used in a digital video format, according to the present invention.

Referring now to FIG. 3, the refresh descriptor data may be embedded in a user data field ("user_data") of the sequence or picture header, or alternatively, in a program specification information ("PSI") data field. In a preferred embodiment of the invention, the refresh descriptor data are embedded in the PSI data field. A preferred embodiment of the refresh descriptor data fields are defined as follows:

descriptor_tag: an eight bit field that uniquely identifies the data which follows as belonging to a refresh_period descriptor field (described below).

descriptor_length: a(n) [eight] bit field set to indicate a length of 14 bytes, for the refresh descriptor data.

As described above, any repeating pattern may be used for progressive refresh. Accordingly, the following four fields which are preferably 1-bit in length, may take on any combination of values depending on the combination of techniques used for prediction refresh:

intra_frame_strategy_bit: indicates whether fully intraframe coded frames are used for prediction refresh.

intra_slice_strategy_bit: indicates whether fully intraframe coded slices are used for prediction refresh.

structured_progressive_refresh_bit: indicates whether a regular repeating pattern of intraframe coded regions is used for prediction refresh.

unstructured_progressive_refresh_bit: indicates whether random macroblocks are selected for intraframe coding for prediction refresh.

The remaining data fields are preferably 8-bit or 16-bit in length, as indicated:

refresh_region_<top, left>_index: Two eight bit fields which provide an index of the top, left corner of the region, which is intraframe coded for prediction refresh. The values are preferably representative of the units of macroblocks used for prediction refresh. According to a preferred embodiment of the present invention, if either value is set to 255, then this field is ignored. When used, these values only apply to the frame indicated by the data field "next_refresh_start_frame" (described below).

refresh_region_<width, height>: Two separate eight bit fields which represent the width and height of the region which is intraframe coded for prediction refresh, preferably expressed in units of macroblocks. If either value is set to 0 then these fields are ignored.

refresh_period: An eight-bit field used to provide the number of frames after which a decoder can be assured of having a completely determined picture for reference purposes. If this value is set to 0 then the field is ignored.

next_refresh_<start, end>_frame: A sixteen bit field that specifies the temporal references (10 bit values in current MPEG standards) which define the range of frames which, when decoded, result in a completely determined reference picture. According to the invention, a value of 65535 is ignored.

next_intra_frame: A sixteen bit field that provides the temporal reference of the next reference frame that is completely intraframe coded.

The fields described above are imbedded in the encoded video bitstream to assist a decoder in the presentation of pictures during acquisition.

Referring back to FIG. 2, from this point, the compressed bitstream may be transferred to any of several storage mediums 22 for later retrieval and decoding for display. Such storage mediums 22 include, but are not limited to, buffer memory devices, digital video disc storage, magnetic tape storage and magnetic disc storage. Alternatively, the compressed data may be modulated by channel modulator 24 and transmitted as a digital television broadcast signal over, e.g., a conventional 6 MHz terrestrial or cable channel.

The modulator 24 may be a 64 Quadrature Amplitude Modulator (QAM), which transmits the data stream within the 6 MHz transmission channel. However, the present invention is not limited as such, and other modulation methods, such as vestigial side band (VSB) can also be used without departing from the scope of the invention.

A receiver apparatus, designated generally as 25, may, e.g., be incorporated into a television receiver (not shown) for receiving the video bitstream containing the descriptor refresh data. The receiver apparatus 25 contains a demodulator 26, transport decoder 28, a refresh control processor 29, an inverse quantization circuit and inverse discrete cosine transform (IQ\IDCT) circuit 30 and a display controller 32. The receiver apparatus 25 is coupled to a display device 34 not forming part of the invention, and provided only for ease in understanding how the invention may be practiced.

The demodulator 26 receives the modulated transport bitstream and recovers the transport bitstream from an analog encoded signal. The bitstream is then transmitted to the transport decoder 28 where the encoded video data is segregated from the overhead control and header data. Here, the refresh descriptor data described above is sent to the refresh control processor 29. The refresh control processor 29, based on the refresh descriptor data, provides control signals to the display controller 32 to inhibit frame display until an adequate amount of prediction references based on the intracoded data of previous frames is developed. In one embodiment, frame display is inhibited until all regions of the frame can be reconstructed from valid prediction references based on intracoded data. In another embodiment, frame display is inhibited until any suitable number of regions are reconstructed as such, with the remaining regions being displayed after error concealment techniques are applied.

In the transport decoder 28, video and control data are demultiplexed from the incoming bitstream. From there, the IQ\IDCT circuit 30 receives the video data and performs an inverse quantization step. Thereafter, an inverse discrete cosine transform of the two dimensional frequency components of the data into spatial components is performed to reconstruct the pixel values, block by block. The digital video data is then transmitted to the display controller 32 which begins to reconstruct a video frame, macroblock by macroblock, slice by slice, until an entire frame is constructed. A complete prediction reference frame can be progressively constructed after a certain number of frames (as may be indicated in a refresh descriptor data) has been acquired.

As the reference frame is constructed, the display controller 32 advantageously employs data found in the refresh_period field, the next_refresh_<start, end>_frame field, and the next_intra_frame fields to determine the number of frames which need to be decoded before a complete reference picture is obtained. This permits the display controller 32 to inhibit display of the minimum number of frames to avoid showing an unsuitable amount of erroneous or uninitialized regions within the frames, thereby allowing for presentation of more pleasing pictures at beginning of a new program or after signal dropout. Once a suitable amount of valid prediction references is acquired, the decoder 25 can output the video data to the display device 34 for viewing. The display device 34 may be any device from which a viewer may observe the video pictures, such as, for example, a cathode ray tube device or a flat-panel display device.

Figure 4:
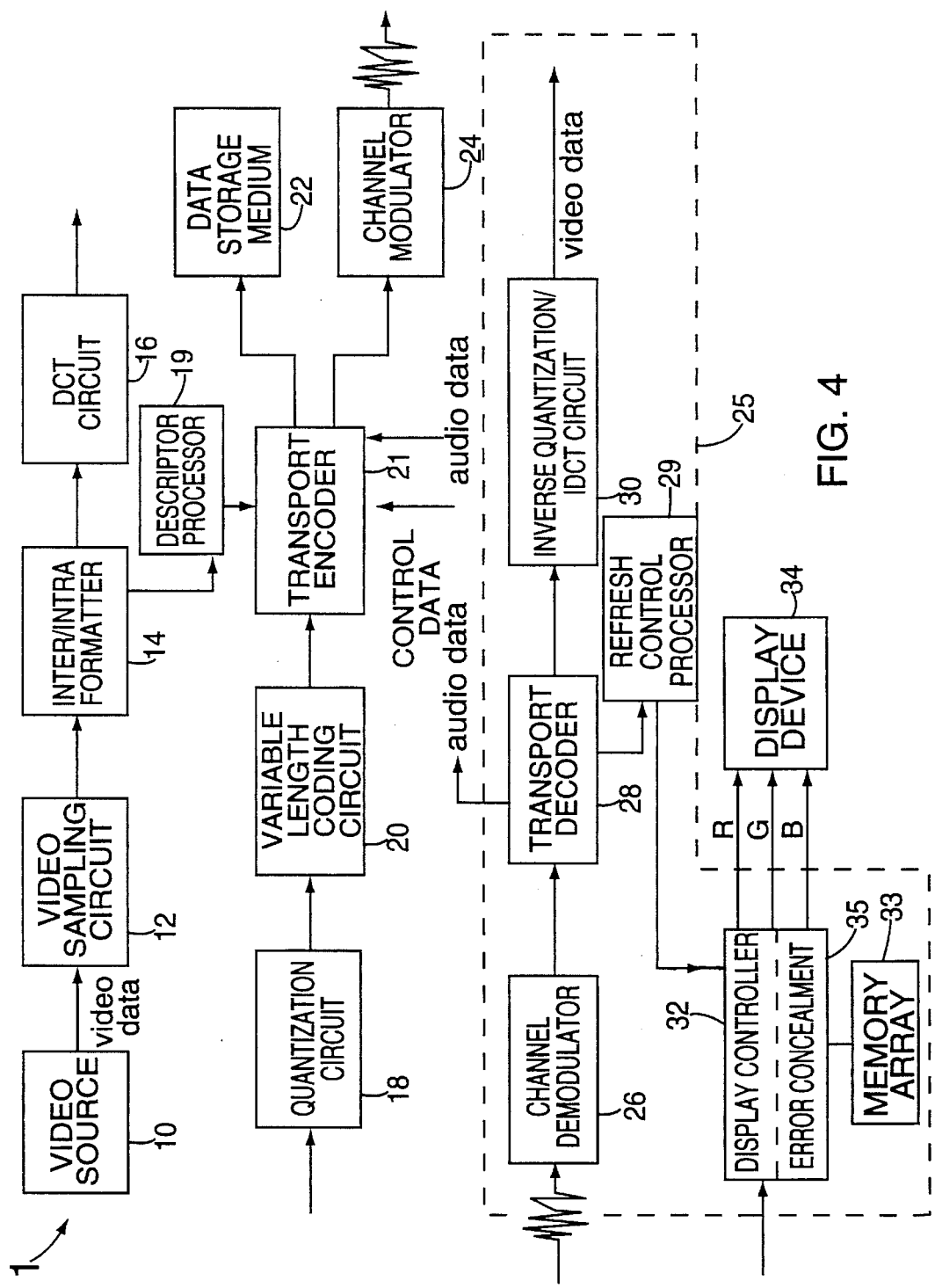
FIG. 4 is a block form diagram of the operative arrangement of another embodiment of the circuit components of the present invention.

In another embodiment of the present invention (shown in FIG. 4), the display controller 32 includes at least one memory array 33, and preferably a plurality of memory arrays 33, in which each element (not shown) of an array corresponds to a region of the picture. It is anticipated that each memory array 33 may be used to store data corresponding to a separate video frame. Accordingly, the data related to several video frames can be stored in the memory array 33. As understood by those skilled in the art, the memory arrays 33 may be part of a decoder integrated circuit, or may be an external memory array provided with suitable interface circuitry.

The memory elements of each array 33 provide storage for recording the regions of a frame which have been established through intra-coding or through a series of predictions based on valid prediction references. In accordance with the present invention, such an established region is designated as initialized or "clean" in the memory array 33. The region could, for example, comprise the size of a macroblock region (16×16 pixels), an 8×8 pixel region or a 4×4 pixel region.

Each element of memory array 33, which may be only 1 bit in length, is initially set in a state indicating that the corresponding video region is uninitialized or "dirty". As the decoder 25 decodes an intraframe macroblock, it sets the corresponding element in memory array 33 to indicate that a "clean" region has been established. In addition to regions determined only through intra-coded data, regions determined through a series of predictions, each of which were made from fully clean references (such as the decoded intra-coded data, or from regions in I-frames), are also initialized as "clean". Regions predicted from uninitialized regions are identified as "dirty". Regions having lost video data due to generally uncorrectable errors are also identified as "dirty". In this manner, the display controller 32 uses the memory arrays 33 to record the regions of the picture which have been decoded into useful prediction references.

Using this information, the display controller 32 can immediately present partial pictures to the viewer which have improved picture quality. The display controller 32 may begin to transmit video pictures to the display device 34 before waiting for the number of frames needed for a complete reference picture. When displaying such pictures, regions that are designated "dirty" may be displayed using error concealment techniques as are known to those skilled in art, rather than displaying "dirty" data for those regions of the frame. Known concealment techniques include, for example, displaying a constant shade of gray; displaying a constant color which is the color of the average of the colors of the pixels in the "clean" regions; intraframe interpolation between "clean" regions; or displaying color data from adjacent "clean" regions. To this end, an error concealment circuit 35 conceals or replaces video information designated as "dirty", including video lost due to generally uncorrectable errors. When there are "dirty" regions of data, or uncorrectable errors in the video data, the received erroneous video data is discarded. The error concealment circuit 35 then performs masking operations aimed at mitigating the effects of the "dirty" or lost regions of data. Under a progressive refresh scheme, each missing macroblock may be replaced with either co-located macroblocks from the previously reconstructed frame, or determined by any combination of the concealment techniques mentioned above. When no errors or dirty regions are present, data passes through the error concealment circuit 35 unaltered.

These concealment procedures may be used separately, or in combination with the above described refresh frame signaling scheme to enable the decoder 25 to quickly deliver more pleasing pictures after program dropout or switching.

Notably, the encoder/decoder transmission system 1 contemplated by the present invention may be implemented programmatically or by direct electrical connection through customized integrated circuits, or a combination of both, using any of the methods known in the industry for providing the functions described above without departing from the teachings of the invention. Those skilled in the art will appreciate that from the disclosure of the invention provided herein, commercial semiconductor integrated circuit technology would suggest numerous alternatives for actual implementation of the inventive functions of the encoder/decoder transmission system 1 that would still be within the scope of the invention.

Although the invention has been described in detail with particular reference to a preferred embodiment thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. A method for controlling the display of progressively refreshed decoded compressed image representative data, said image representative data being representative of a video frame divided into a plurality of subframes, and being assembled with control data, wherein successive video frames include a plurality of subframes having intracoded video signals or a plurality of subframes having intracoded video signals and subframes having intercoded video signals based on predictions from intracoded video signals, said method comprising the steps of:

generating data indicating the number of video frames necessary for acquiring subframes having intracoded video signals or intercoded video signals based on predictions from intracoded video, to properly reconstruct a video frame;

embedding said data indicating the number of necessary video frames within said control data; and inhibiting the display of said video frames in response to said data indicating the number of necessary video frames until a video frame of image representative data including subframes having intracoded video signals or intercoded video signals based on predictions from intracoded video is acquired.

2. A method for controlling the display of progressively refreshed decoded compressed image representative data in accordance with claim 1, wherein said subframes having intracoded video signals in successive video frames are selected from a repeating pattern.

3. A method for controlling the display of progressively refreshed decoded compressed image representative data in accordance with claim 1, wherein said subframes having intracoded video signals in successive video frames are selected randomly.

4. A method for controlling the display of progressively refreshed decoded compressed image representative data in accordance with claim 1, wherein said subframes are macroblocks.

5. A method for controlling the display of progressively refreshed decoded compressed image representative data in accordance with claim 1, wherein said subframes are slices.

6. A method for improving the display of progressively refreshed decoded compressed image representative data, said image representative data being representative of a video frame divided into a plurality of subframes, wherein successive video frames include a plurality of subframes having intracoded video signals or a plurality of subframes having intracoded video signals and subframes having intercoded video signals based on predictions from intracoded video signals, said method comprising the steps of:

identifying subframes of video signals which are decoded from image representative data having intracoded video signals or intercoded video signals based on predictions from intracoded video signals;

storing in at least one memory array data indications for respective subframes identified as having decoded intracoded video signals or decoded intercoded video signals based on predictions from decoded intracoded video signals; and displaying substitute video signals, in response to said data indications stored in said memory array, for subframes not identified as having decoded intracoded video signals or decoded intercoded video signals based on predictions from decoded intracoded video signals.

7. A method for improving the display of progressively refreshed decoded compressed image representative data in accordance with claim 6, wherein said subframes having intracoded video signals in successive video frames are selected from a repeating pattern.

8. A method for improving the display of progressively refreshed decoded compressed image representative data in accordance with claim 6, wherein said subframes having intracoded video signals in successive video frames are selected at random.

9. A method for improving the display of progressively refreshed decoded compressed image representative data in accordance with claim 6, wherein said subframes are macroblocks.

10. A method for improving the display of progressively refreshed decoded compressed image representative data in accordance with claim 6, wherein said subframes are slices.

11. A video decoder for decompressing and controlling the display of progressively refreshed MPEG image representative data, said image representative data being representative of a video frame divided into a plurality of subframes, wherein successive video frames include a plurality of subframes having intracoded video signals or a plurality of subframes having intracoded video signals and subframes having intercoded video signals based on predictions from intracoded video signals, said video decoder comprising:

decompression means for decompressing MPEG compressed image representative data;

processor means for generating indicia of subframes of video signals which are decoded from image representative data having intracoded video signals or intercoded video signals based on predictions from intracoded video signals;

memory means for storing said indicia of respective subframes identified as having intracoded video signals or intercoded video signals based on predictions from intracoded video signals; and controller means responsive to said indicia stored in said memory means for displaying video signals based on said subframes identified as having intracoded video signals or intercoded video signals based on predictions from intracoded video signals.

12. A video decoder in accordance with claim 11 further comprising a video display concealment means for displaying substitute video signals for video signals corresponding to subframes not identified as having intracoded video signals or intercoded video signals based on predictions from intracoded video signals.

13. A method for improving the display of progressively refreshed decoded compressed image representative data, said image representative data being representative of a video frame divided into a plurality of subframes, wherein successive video frames include a plurality of subframes having video signals based on spatial compression of said video signals without reference to video signals in other video frames, plurality of subframes having said spatially compressed video signals and subframes having temporal compressed video signals based on video signals in more than one video frame and on predictions from said spatially compressed video signals, said method comprising the steps of:

generating indicia of subframes of video signals which are decoded from image representative data having spatially compressed video signals or temporally compressed video signals based on predictions from said spatially compressed video signals;

storing in at least one memory array data said indicia of respective subframes identified as having decoded spatially compressed video signals or decoded temporally compressed video signals based on predictions from said decoded spatially compressed video signals;

displaying video signals, in response to said data indications stored in said memory array, for subframes identified as having decoded spatially compressed video signals or decoded temporally compressed video signals based on predictions from said decoded spatially compressed video signals; and displaying substitute video signals for subframes not identified as having decoded spatially compressed video signals or decoded temporally compressed video signals based on predictions from said decoded spatially compressed video signals.

14. A method for improving the display of progressively refreshed decoded compressed image representative data in accordance with claim 13, wherein said subframes having said spatially compressed video signals in successive video frames are selected from a repeating pattern.

15. A method for improving the display of progressively refreshed decoded compressed image representative data in accordance with claim 13, wherein said subframes having said spatially compressed video signals in successive video frames are selected at random.

16. A method for improving the display of progressively refreshed decoded compressed image representative data in accordance with claim 13, wherein said subframes are configured as macroblocks in accordance with an MPEG-like format.

17. A method for improving the display of progressively refreshed decoded compressed image representative data in accordance with claim 13, wherein said subframes are configured as slices in accordance with an MPEG-like format.

* * * * *